United States Patent
Collard (10) Patent No.: US 7,100,157 B2
(45) Date of Patent: Aug. 29, 2006

(54) METHODS AND APPARATUS TO AVOID DYNAMIC MICRO-ARCHITECTURAL PENALTIES IN AN IN-ORDER PROCESSOR

(75) Inventor: Jean-Francois C. Collard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 10/253,772

(22) Filed: Sep. 24, 2002

(65) Prior Publication Data

US 2004/0060040 A1    Mar. 25, 2004

(51) Int. Cl.
*G06F 9/45*    (2006.01)
(52) U.S. Cl. .................. 717/161; 717/151; 717/159
(58) Field of Classification Search ............ 717/151, 717/154, 159, 140
See application file for complete search history.

(56) References Cited

U.S. PATENT DOCUMENTS

| | | | |
|---|---|---|---|
| 5,761,515 A * | 6/1998 | Barton et al. ............... | 717/158 |
| 5,862,385 A * | 1/1999 | Iitsuka ....................... | 717/156 |
| 5,958,041 A * | 9/1999 | Petolino et al. ............. | 712/214 |
| 6,092,180 A * | 7/2000 | Anderson et al. ........... | 712/200 |
| 6,282,707 B1 * | 8/2001 | Isozaki ....................... | 717/157 |
| 6,301,641 B1 * | 10/2001 | Verhoeven et al. ......... | 711/118 |
| 6,308,261 B1 * | 10/2001 | Morris et al. ............... | 712/219 |
| 2003/0154349 A1 * | 8/2003 | Berg et al. .................. | 711/137 |

OTHER PUBLICATIONS

"Informing Memory Operations: Memory Performance Feedback Mechanisms and Their Applications", Mark Horowitz, Margaret, Todd C. Mowry and Machel D. Smith, ACM Transactions on Computer Systems, vol. 16, No. 2, May 1998, pp. 170-205.*
A. Azevedo et al. "Architectural And Compiler Strategies For Dynamic Power Management In the COPPER Project." Center For Embedded Computer Systems, University of California, Irvine. Apr. 14, 2001.
A. Nicolau et al. "The COPPER Project. Compiler Controlled Power Performance Management." http://www.cecs.uci.edu/~copper/publications/copperIWIA01.pdf. Dated Apr. 18, 2001.

* cited by examiner

*Primary Examiner*—Wei Zhen
*Assistant Examiner*—Philip Wang
(74) *Attorney, Agent, or Firm*—Hanley, Flight & Zimmerman, LLC

(57) ABSTRACT

Methods and apparatus to avoid dynamic micro-architectural penalties in an in-order processor are disclosed. In an example, a compiler inserts decision code into the object code to thereby cause the in-order processor to operate like an out of order processor to operate with respect to at least some memory access instructions. The decision code determines at run time of the object code whether a load instruction is a likely cache hit. Based on that determination, the decision code causes the in-order processor to execute a use instruction at a first time if the load instruction is a likely cache hit, and to execute a copy of the use instruction at a second, later time if the load instruction is not a likely cache hit.

29 Claims, 11 Drawing Sheets

```
       extr r4 = rx, 0, N
       extr r5 = ry, 0, N ;;
       cmp.eq p1, p2 = r5, r4 ;;   // p1 implies st1 and ld1 access
                                   // the same line .
       st [rx] = ..                // Cycle 1
(p2)   ld rz = [ry] ;;             // Cycle 1
(p1)   ld rz = [ry]                // Cycle 2
```

FIG. 15

```
       extr r4=r2, 4, 4            // Scheduled in previous cycles .
       extr r5=r3, 4, 4;;          // Scheduled in previous cycles .
       cmp.eq p1, p2 = r4, r5 ;;   // p1 means bank conflict .
       ldfs f2 = r2                // Cycle 1
(p2)   ldfs f3 = [r3]              // Cycle 1 : ldfs not delayed in good case .
       ;;
(p1)   ldfs f3 = [r3] ;;           // Cycle 2 : Delayed only if bank conflict .
       use of f2                   // Cycle 7
(p2)   use of f3 ;;                // Cycle 7
(p1)   use of f3                   // Cycle 8
```

FIG. 16

```
       ld rx = [ry] ;;             // Cycle 1
(p1)   rz = use of rx ;;           // Cycle 2 : Use is scheduled for L1 .
                                   // Other useful instructions here .
(p2)   rz = use of rx ;;           // Cycle 6 : Use is scheduled for L2 .
```

FIG. 17

```
Loop :
        tbit.z.unc p1, p2 = i,0        // Cycle 1
        tbit.z.or  p1, p2 = i,1 ;;     // 1
        ld rx = [ry] ;;                // 2
(p1)    rz = use of rx                 // 3
(p1)    br L ;;                        // 3
(p2)    rz = use of rx ;;              // 7
L:      add i = 1, i
        add ry = 1, ry ;;
        cmp.le p3 = i, N
(p3)    br.cond Loop; ;
```

FIG. 18

```
        ld rx = [ry] ;;
(p1)    rz = use of rx            // Cycle 2
(p1)    br L ;;                   // Cycle 2. Branch is inserted, and ends
                                  // the first copy of the chain of uses.
        rz = use of rx ;;         // Cycle 6. Predicate p2 can safely be removed.
L:
        Sequel                    // Cycle 7
```

METHODS AND APPARATUS TO AVOID DYNAMIC MICRO-ARCHITECTURAL PENALTIES IN AN IN-ORDER PROCESSOR

FIELD OF THE DISCLOSURE

This disclosure relates generally to compilers and, more particularly, to methods and apparatus to avoid dynamic micro-architectural penalties in an in-order processor.

BACKGROUND

The typical computer has a random access memory hierarchy including one or more levels of on-processor cache memory, a main memory (located off of the processor chip) and a mass storage device (e.g., a hard disk drive, etc.). Typically, accessing the first level of cache memory (L1 cache) is fastest (i.e., has the lowest latency) and accessing the mass storage device is slowest. The latencies associated with accessing intermediate levels of the memory hierarchy fall between these two extremes of memory access latencies. In addition to increasing in latency time, the various levels of the memory hierarchy typically increase in size from the highest level of the memory hierarchy to the lowest level of memory hierarchy.

In the typical case, cache memory has an inclusive nature. Thus, when data is retrieved from a given level of the memory system (e.g., a hard disk drive), it is written into all levels of the cache (e.g., the L1 cache, the level 2 (L2) cache, the level 3 (L3) cache, etc.). This practice maximizes the likelihood that data needed for a later instruction is present in the highest levels of the cache, thereby reducing the number of accesses to slower memory resources and the number of cache misses (i.e., a failed attempt to retrieve data from a cache level that does not contain the desired data).

Architectural or micro-architectural effects often cause performance penalties when accessing the memory hierarchy. The best-known example of such effects is the classic load wherein data is loaded from some level of memory to the processor. The latency of such a load operation may range from one cycle (assuming the first level cache has a latency of 1) to hundreds of cycles, depending on which memory level currently contains the data to be loaded. The fact that the actual latency varies means that, in order to avoid stalls, uses of the data being loaded is delayed by an amount of time that is hard, if not impossible to predict.

Out-of-order processors solve this issue by reordering load uses until the data being loaded is available. In other words, load uses are frozen until their data is ready for use (i.e., actually located in the processor's registers), while letting other instructions execute. This freezing feature is built into the hardware, and the software does not have to worry about it. The decision to freeze or delay a use is done dynamically (i.e., at execution time).

In-order processors lack this dynamic reordering feature. Instead, software for in-order processors must decide beforehand, that is statically, when they schedule a load's use. (Typically, the software is a compiler, so the expressions "statically" and "at compile-time" can be used interchangeably.) Aggressive static techniques typically bet on the best case and, thus, schedule the use instruction at the earliest possible time immediately after the load is executed. A penalty is then paid each time the load takes more than that time to complete, since usually all instructions following the use are delayed as well. Defensive software separates the use from the load by an amount of time to account for expected delays. When such delays do not happen, precious cycles have been spent waiting uselessly. Prior art in-order processors force one to choose a strategy, aggressive or defensive, once (i.e., at compile time) and to stay with that choice for all run-time executions of the load-use sequence.

Software techniques having some similarity to the techniques disclosed below are known. For example, code versioning is a technique that develops specialized copies of software code and inserts decision code to determine which version of the code executes. In this technique, the two versions of the code being versioned are different from one another. Frequently, one version is highly simplified for the relevant special case (e.g., "multiply X*Y" may be versioned such that, if either X or Y=0, then the multiplication step is skipped). Versioning is not meant to hide micro-architectural effects, but is instead used to expedite code execution. Code versioning has, however, been used to address high-level power effects (e.g., execute one set of code if the computer is connected to a source of commercial power, but execute a stripped-down version of the code if the computer is running on batteries to reduce power consumption.)

As another example, instruction fusion is a technique which replaces two identical instructions predicated by opposite conditions (e.g., instruction (1) if X, do Y, instruction (2) if not X, do Y) with one instruction with no predicate (e.g., do Y). The goal of this technique is to reduce code size.

DETAILED DESCRIPTION

Figure 1:
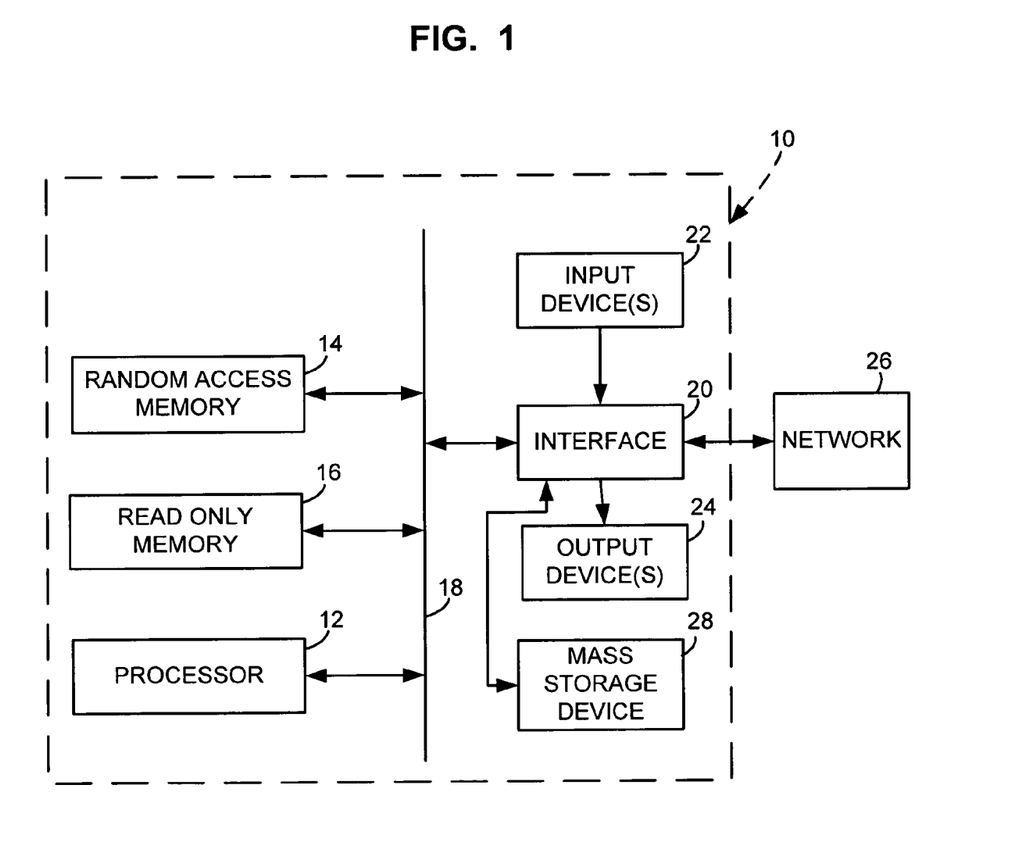
FIG. 1 is a schematic illustration of an example computer.

FIG. 1 is a block diagram of an example computer 10 capable of implementing the apparatus and methods disclosed herein. The computer 10 can be a personal digital assistant (PDA), a laptop computer, a notebook computer, a desktop computer, a server, an Internet appliance, or any other type of computing device.

The computer 10 of the instant example includes a processor 12 which is implemented by one or more in-order processors. For example, the processor 12 can be implemented by one or more Intel® microprocessors from the Pentium® family, the Itanium™ family or the XScale™ family. Of course, other out of order processors from other families are also appropriate.

As is conventional, the processor 12 is in communication with a main memory including a volatile memory 14 and a non-volatile memory 16 via a bus 18. The volatile memory 14 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 16 may be implemented by flash memory and/or any other desired type of memory device. Access to the main memory 14, 16 is typically controlled by a memory controller (not shown) in a conventional manner.

The computer 10 also includes a conventional interface circuit 20. The interface circuit 20 may be implemented by any type of well known interface standard, such as an Ethernet interface, a universal serial bus (USB), and/or a third generation input/output (3GIO) interface.

One or more input devices 22 are connected to the interface circuit 20. The input device(s) 22 permit a user to enter data and commands into the processor 12. The input device(s) can be implemented by, for example, a keyboard, a mouse, a touchscreen, a track-pad, a trackball, isopoint and/or a voice recognition system.

One or more output devices 24 are also connected to the interface circuit 20. The output devices 24 can be implemented, for example, by display devices (e.g., a liquid crystal display, a cathode ray tube display (CRT), a printer and/or speakers). The interface circuit 20, thus, typically includes a graphics driver card.

The interface circuit 20 also includes a communication device such as a modem or network interface card to facilitate exchange of data with external computers via a network 26 (e.g., an Ethernet connection, a digital subscriber line (DSL), a telephone line, coaxial cable, a cellular telephone system, etc.).

The computer 10 also includes one or more mass storage devices 28 for storing software and data. Examples of such mass storage devices 28 include floppy disk drives, hard drive disks, compact disk drives and digital versatile disk (DVD) drives.

As is known, the memory system of the example computer 10 is arranged in a hierarchical fashion. For example, the processor(s) 12 usually include on-board cache memory, which is the highest level of memory having the lowest access time. The on-board cache memory is typically the smallest cache and is referred to as L1 cache. Any additional level(s) of cache progressively increase in size and access time. For example, the computer 10 usually includes a second level of cache, referred to as L2 cache. The L2 cache is larger and slower to access than the L1 cache. For example, the L2 cache can be implemented by SRAM. A third level of cache (L3 cache) is larger than and has slower access times than the L2 cache. For example, the L3 cache can be implemented by DRAM. In the example of FIG. 1, the L2 and L3 caches are represented by the random access memory 14.

To execute program instructions, a processor 12 typically causes any needed data to load into the cache from a mass storage device. When data is loaded into the cache, it is typically written to all levels of cache to increase the likelihood that some level of cache will hold the data should it be needed again in the future. This redundancy feature typically reduces the number of accesses to the mass storage device 28, which typically has the slowest access time of any portion of the memory.

When a processor 12 needs to execute an instruction, any data needed by the instruction is loaded from the cache (if present) or mass storage device 28 (if not present in the cache) to one or more registers in the processor 12 where it is then acted upon as dictated by the instruction.

Figure 2:
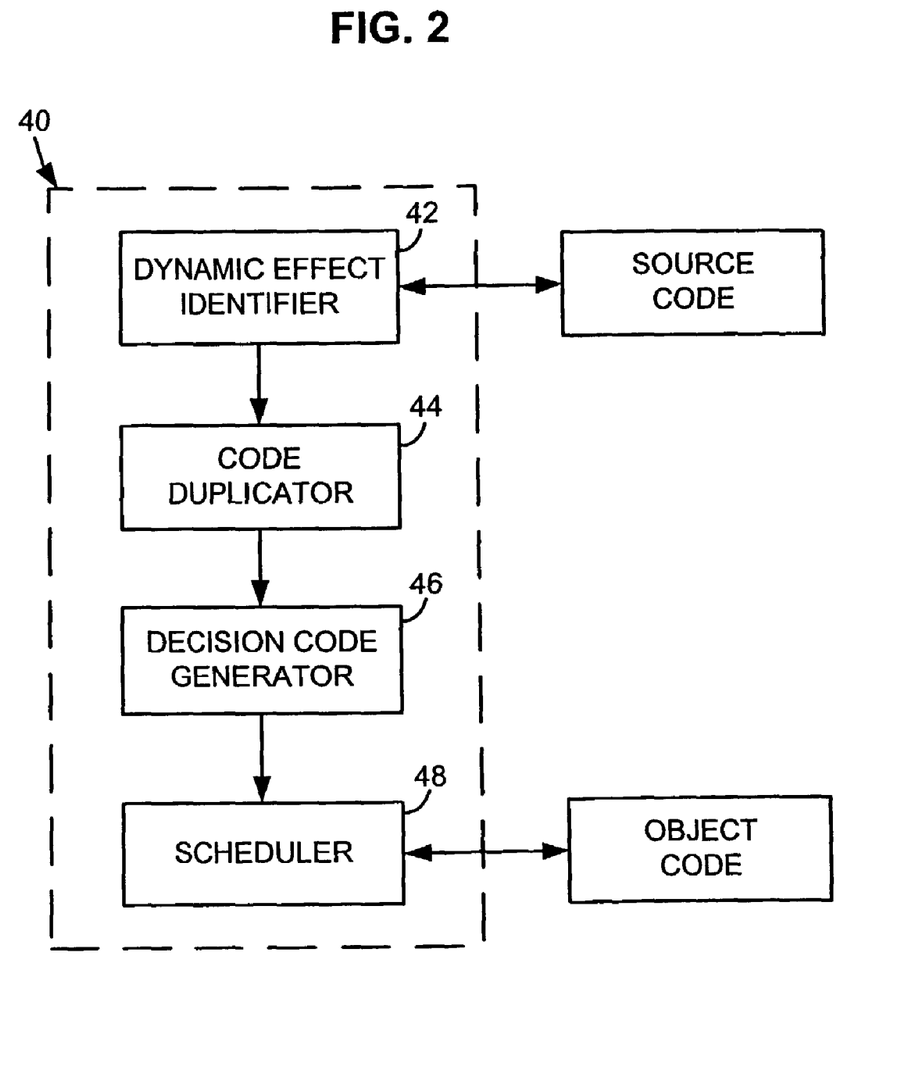
FIG. 2 is a schematic illustration of an example apparatus to avoid micro-architectural penalties in the in-order processor of the computer of FIG. 1.

As discussed above, in-order processors such as the processor 12 of the computer of FIG. 1 schedule instructions using data loaded from memory statically (i.e., when specified by the compiled code) as opposed to out-of-order processors which schedule instructions dynamically (i.e., at run time of the code). As a result, in-order processors can sometimes suffer penalties in terms of execution time when, for example, a use instruction is scheduled for execution at a time when the necessary data is unavailable. Such penalties may occur when, for example, a use instruction is mis-scheduled because the computer did not take into account instances where the micro-architecture of the processor 12 and/or cache causes delays in a data load. FIG. 2 illustrates an example apparatus 40 which produces object code stored in the memory 14 from source code stored in the memory 14, wherein the object code avoids or reduces these micro-architectural penalties when executed by an in-order processor.

Referring to FIG. 2, in this example the apparatus 40 includes a dynamic effect identifier 42, a code duplicator 44, a decision code generator 46, and a scheduler 48. The dynamic effect identifier 42 reviews the source code to identify instructions which may have a dynamic effect. A dynamic effect is any delay or run-time penalty that may result when executing the code. Example dynamic effects include: a likely cache miss, a likely cache hit, a likely bank conflict between two instructions, simultaneous access of two instructions to the same cache line, and/or a spatial locality effect. Instructions identified by the dynamic effect identifier 42 are typically instructions that use data that, depending on certain factors, may become available for processing at different cycles of the processor 12. If the in-order processor 12 attempts to execute such an instruction before the data is ready, performance penalties will result.

To avoid such penalties, the apparatus 40 is further provided with the code duplicator 40. The code duplicator 40 creates one or more identical copies of an instruction identified by the dynamic effect identifier 42 as possibly having a dynamic effect. In some instances, an entire chain of instructions may operate upon the same data as the instruction with the dynamic effect, or one or more instructions may not be able to execute until the instruction with the possible dynamic effect completes execution (e.g., the instruction(s) following the instruction with the dynamic effect operate upon the result value created by the instructions with the dynamic effect). In such instances, the code duplicator 44 creates one or more copies of the entire chain of instructions which may be impacted by the possible dynamic effect.

As mentioned above, the apparatus 40 also includes a decision code generator 46. The decision code generator 46 creates decision code for inclusion in the object code. The decision code executes at run time of the object code and functions to determine which copy (which may be the original or a duplicate of the original), of an instruction or chain of instructions executes.

The apparatus 40 also includes a scheduler 48. The scheduler 48 schedules the object code such that the decision code created by the code generator 46, the original instruction or chain of instructions having the dynamic effect, and the copy or copies of the instruction or chain of instructions having the dynamic effect are scheduled for possible execution in appropriate cycles of the processor 12. Typically, the copy or copies of the instruction or instruction chain having the dynamic effect will be scheduled for execution at later cycle(s) than the original instruction or chain of instructions having the dynamic effect. The decision code created by the decision code generator 46, thus, decides which cycle(s) will be used to execute the instruction(s) at issue by picking a copy or the original instruction(s) to execute based on the presence or absence of one or more run-time conditions. In this way, the apparatus 40 compiles source code into object code such that the in-order processor 12 emulates an out-of-order processor with respect to at least some instructions when executing the object code.

In other words, the apparatus 40 is a compiler which converts source code to object code for execution on an in-order processor. The compiler is structured to insert decision code into the object code which determines at run time if a condition is present. If the condition is present, the decision code causes the in-order processor 12 to execute an instruction at a first time. If the condition is not present, the decision code causes the in-order processor to execute a copy of the instruction at a second time later than the first time. By way of a more specific example, the condition may be whether a load instruction is a likely cache hit, and the instruction and the copy of the instruction can be an instruction that uses the data retrieved by the load instruction.

Figure 3:
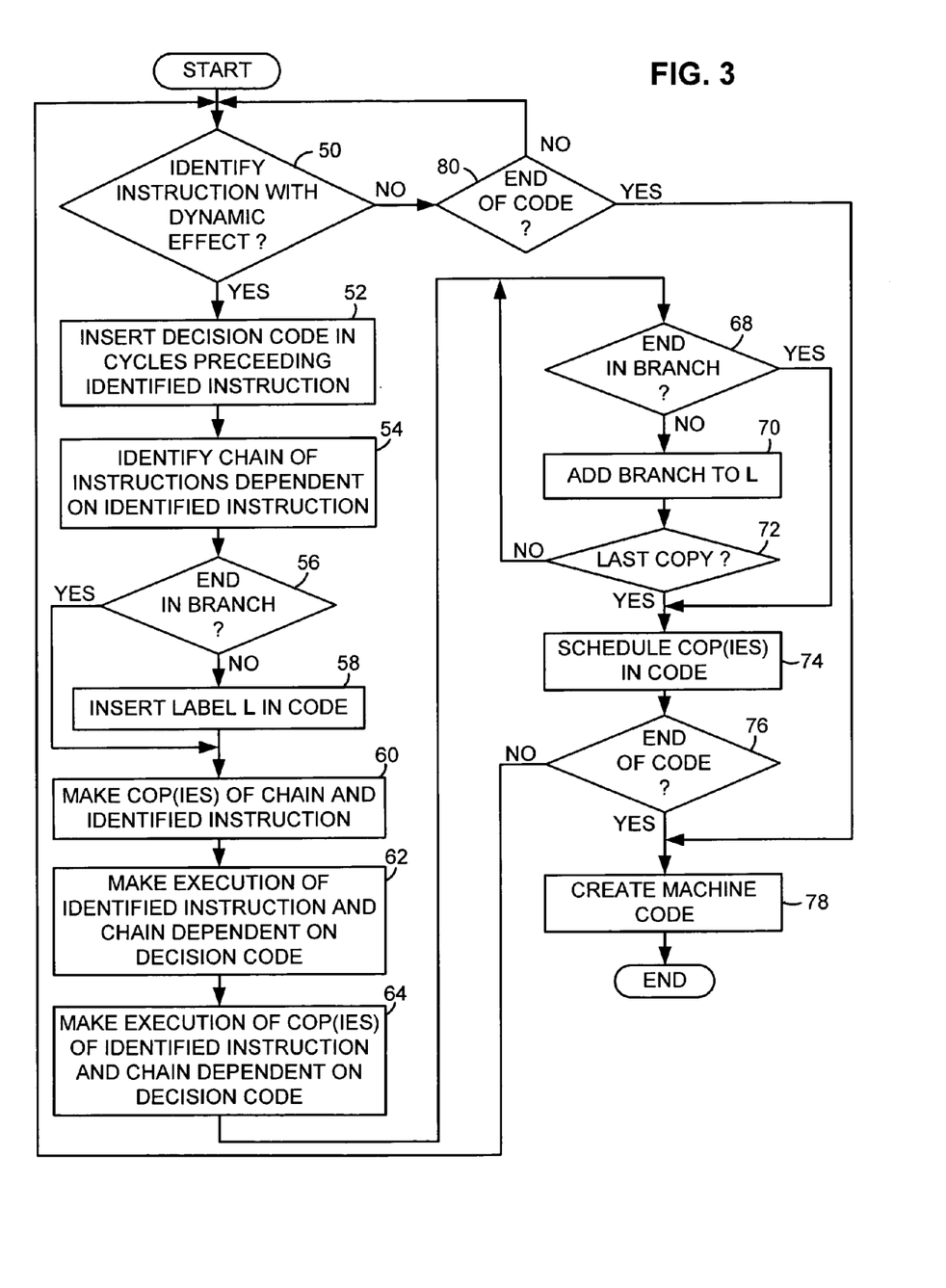
FIG. 3 is a flowchart illustrating an example software program to implement the apparatus of FIG. 2.

An example software program for implementing the apparatus of FIG. 2, is shown in FIG. 3. In this example, the program is for execution by the processor 12 and is embodied in software stored on a tangible medium such as a CD-ROM, a floppy disk, a hard drive, a digital versatile disk (DVD), or a memory associated with the processor 12, but persons of ordinary skill in the art will readily appreciate that the entire program or parts thereof could alternatively be executed by a device other than the processor 12 and/or embodied in firmware or dedicated hardware in a well known manner. For example, any or all of the dynamic effect identifier 42, the code duplicator 44, the decision code generator 46 and/or the scheduler 48 could be implemented by software, hardware, and/or firmware. Further, although the example program is described with reference to the flowchart illustrated in FIG. 3, persons of ordinary skill in the art will readily appreciate that many other methods of implementing the apparatus 40 of FIG. 2 may alternatively be used. For example, the order of execution of the blocks may be changed, and/or some of the blocks described may be changed, eliminated, or combined.

Turning specifically to FIG. 3, the program starts when the dynamic effect identifier 42 reviews the source code for an instruction having a potential dynamic effect (block 50). If no such instruction is found (block 50), and all of the code has been reviewed (block 80), control proceeds to block 78. For purposes of illustration, however, the following assumes such an instruction is found. That instruction is referred to in the following as the "dynamic effect instruction."

If a dynamic effect instruction is identified (block 50), the decision code generator 46 inserts decision code in one or more cycles preceding the identified dynamic effect instruction (block 52). As explained above, the decision code predicates which of at least two identical instructions executes on a value to be determined at run time of the object code.

The dynamic effect identifier 42 then identifies any instruction(s) which are dependent on the dynamic effect instruction (e.g., any instruction which requires the result of the dynamic effect instruction to execute) (block 54). If the chain of instructions including the dynamic effect instruction and any instruction(s) using the result of the dynamic effect instruction already ends in a branch (block 56), control proceeds to block 60. Otherwise, the decision code generator 46 inserts a branching label "L" into the code (block 58).

If a branch is present at the end of the chain (block 56) or after a branch label is inserted (block 58), the code duplicator 44 makes one or more copies of the chain including the dynamic effect instruction (block 60). The number of copies of the chain depends on the dynamic effect being addressed. If, as is typical, the dynamic effect is such that data will be available either immediately (e.g., at a first cycle) or at a later time (e.g., after waiting five cycles), then only one copy is necessary. If it is possible that data will be available immediately (e.g., at a first cycle), at a first later time (e.g., after waiting five cycles), or at a second later time (e.g., after waiting eight cycles), then two copies are necessary. Persons of ordinary skill in the art will appreciate that other numbers of copies and scheduling times are possible.

After the appropriate number of copies of the chain have been made (block 60), the execution of the dynamic effect instruction and any associated chain is made dependent upon the result of the decision code (block 62). Similarly, the execution of the copy(ies) of the dynamic effect instruction and any associated chain is made dependent upon the result of the decision code (block 64). Of course, the dependencies are set so that only one of the chains (i.e., the original code chain or a copy of the code chain) executes for each given pass through the code. The decision code executes on every pass through the code since its execution is necessary to dictate which of the chains execute to address the dynamic effect encountered in that particular pass through the code.

After the execution dependencies are established (blocks 62 and 64), control enters a loop whereby a branch instruction is added to the end of each chain. In particular, if the original chain including the dynamic effect instruction ended in a branch (block 68), control advances to block 74. If it did not end in a branch (block 68), then a branch to the label L is inserted at the end of the chain (block 70). If the chain modified by the addition of the branch label L is the last chain (block 72), control proceeds to block 74. Otherwise, control returns to block 68 where the next chain copy is processed to add a branch to the label L. By repeated execution of blocks 68-72, a branch instruction is added to the end of every one of the chains except the last chain (which is located immediately before the branch label L, so no branch is needed).

After all required branch statements are added (block 72), the scheduler 48 schedules all of the identical chains (including the original) in the code to address the possible dynamic effect(s) of the dynamic effect instruction (block 74). If all of the source code has been reviewed for instructions with dynamic effects (block 76), the scheduled source code is converted to object code (block 78) and the process ends. Otherwise, control returns to block 50 where the review of the source code continues. If another instruction with a dynamic effect is detected (block 50), control proceeds through blocks 50–76 as explained above. After all of the source code has been reviewed and all dynamic effect instructions have been processed (block 80), control returns to block 78 where the source code is converted to machine code and the compiling process concludes.

Several examples in which the above-described instruction fission technique (wherein one or more instructions involved in a run-time dynamic effect are duplicated and scheduled for execution at different times to ensure the software "adapts" to the micro-architectural condition present at run-time to thereby execute in an efficient manner) is employed will now be explained in detail. The first example is a bank conflict. A bank conflict occurs when two or more load instructions attempt to address the same bank of a cache (e.g., L2 cache) at substantially the same time. Memory circuits typically cannot support such multiple accesses and, thus, one of the load instructions requesting such a simultaneous access will be delayed in time when a bank conflict occurs.

Figure 4:
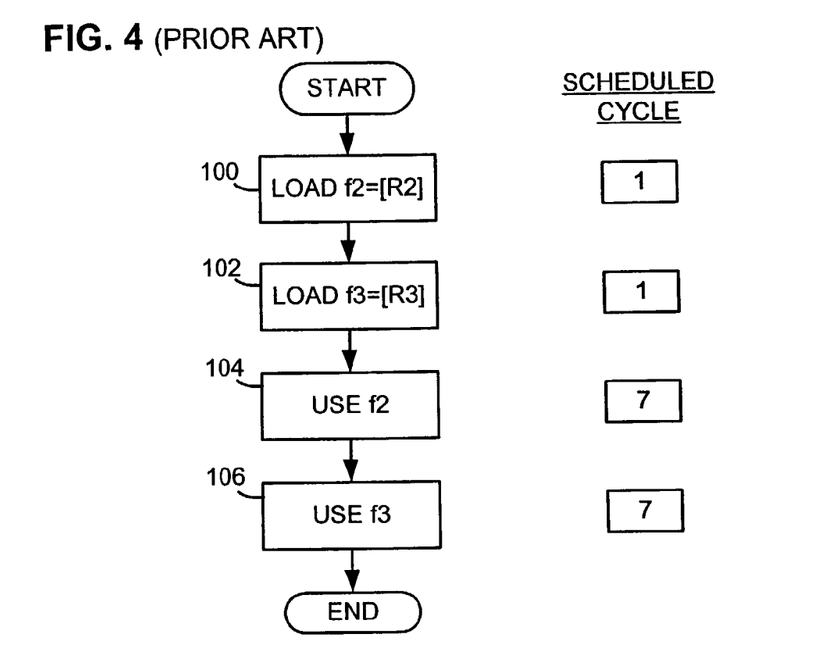
FIG. 4 is a flowchart illustrating a prior art approach to handling a potential bank conflict.

FIG. 4 illustrates an aggressive prior art approach to handling such a potential conflict. In particular, in this example, the software is written to load data from an address in the L2 cache specified in register R2 into a variable F2 (block 100), and to load data from an address in the L2 cache specified in register R3 into a variable F3 (block 102). In the example of FIG. 4, a first instruction uses the data associated with the variable F2 (block 104) and a second instruction uses the data associated with the variable F3 (block 106). If the addresses specified in the registers R2, R3 both address the same memory bank and the associated load instructions execute at substantially the same time, a bank conflict will result and the memory will only be able to immediately service one of the load instructions. Therefore, one of the use instructions (e.g., block 106) will be delayed because the load instruction it depends from (e.g., block 102) is not complete.

In the example of FIG. 4, the scheduler of the compiler is aggressive in that, despite the potential for a bank conflict, it schedules both load instructions in the first cycle and both use instructions in the seventh cycle (e.g., L2 cache has a six cycle latency) on the assumption that bank conflicts will occur infrequently or not at all. If a bank conflict does occur, one of the load/use instruction couples (e.g., blocks 102 and 106) will be delayed by a number of cycles. Assuming for purposes of discussion that the processor 12 is an Intel Itanium2® processor, this hardware enforced delay penalty is six cycles. Therefore, if a bank conflict occurs once out of every five executions of the software of FIG. 4, the average cost of the aggressive scheduling in the Itanium2® processor is:

4/5*7 cycles+1/5*13 cycles=8.2 cycles.

Figure 5:
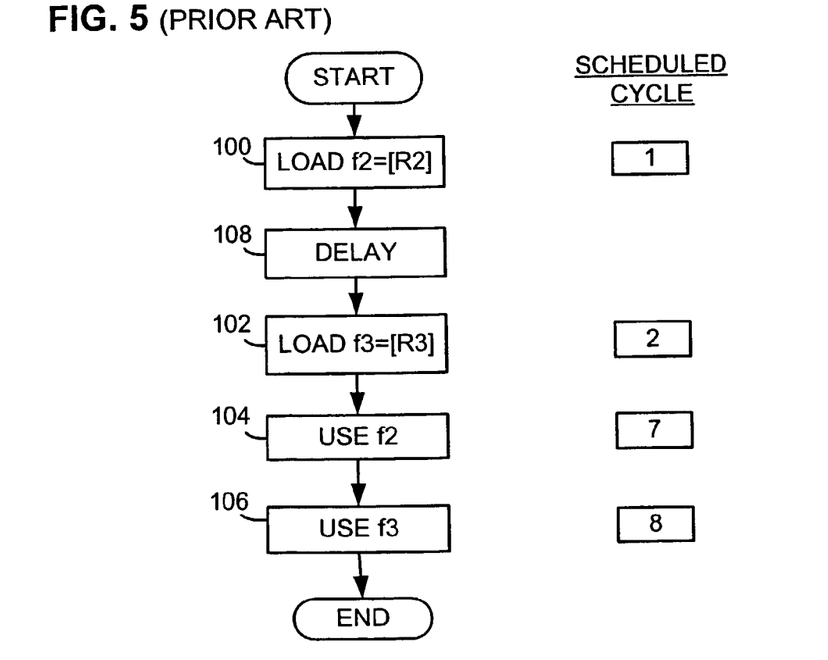
FIG. 5 is a flowchart illustrating another prior art approach to handling the potential bank conflict.

FIG. 5 illustrates another example prior art approach to the same scheduling issue presented in the example of FIG. 4. The example of FIG. 5 is scheduled by a defensive compiler. In particular, whereas the aggressive compiler associated with FIG. 4 assumed there would be infrequent bank conflict, the defensive compiler associated with FIG. 5 assumes that there will frequently be a bank conflict. Thus, the defensive compiler always delays the second load instruction 102. For example, in FIG. 5 the compiler spaces out (block 108) the two load instructions (block 100 and 102) so that the first load instruction (block 100) is executed in the first cycle and the second load instruction (block 102) is executed in the second cycle. This scheduling approach ensures there cannot be a bank conflict since, even if the load instructions (blocks 102 and 104) access the same memory bank, they do not do so at substantially the same time. As shown in FIG. 5, because the second load instruction (block 102) is delayed by one cycle relative to FIG. 1, the second use instruction (block 106) is similarly delayed by one cycle to cycle 8. The average time to execute from the first load instruction (block 100) to the last use instruction (block 106) is now eight cycles, which is slightly better than the 8.2 cycles of the prior art example of FIG. 4.

Figure 6:
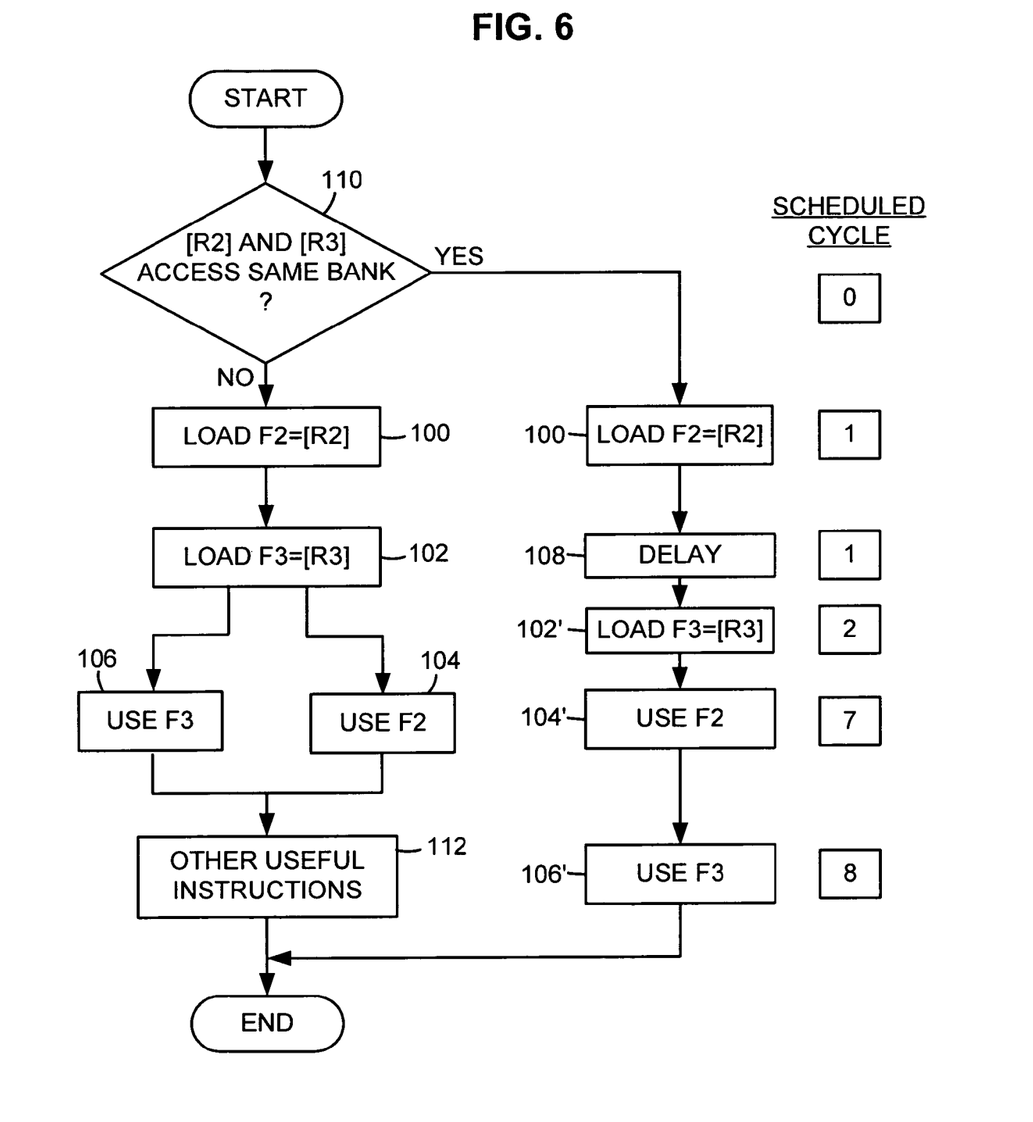
FIG. 6 illustrates an example way in which the apparatus of FIG. 2 handles the potential bank conflict of FIGS. 4 and 5.

FIG. 6 illustrates an example way in which the apparatus of FIG. 3 handles the same potential bank conflict discussed in connection with FIGS. 4–5. As shown in FIG. 6, the apparatus of FIG. 3 inserts decision code (block 110) and copies of the second load instruction (block 102') and the use instructions (blocks 104' and 106') into the software. The decision code (block 110) determines whether the addresses stored in the registers R2 and R3 address the same bank of memory. Most processors have simple formulas to tell whether two addresses have such a conflict. For example, in the Intel Itanium2® processor, bits 7:4 of the address determines the memory bank. Thus, the decision code (block 110) determines whether the addresses stored in registers R2 and R3 present a bank conflict by extracting and comparing bits 4 through 7 of those addresses. For example, the instruction extr rb=ra, p, n can be used to extract n bits, starting at position p, from register ra, and to put the extracted bits in register rb, starting at position 0. After extracting bits 4 through 7 from both addresses and storing those bits in two separate registers R3, R4, the values in the registers R3 and R4 can be compared. If the data stored in registers R3 and R4 match, a bank conflict is present. Otherwise, no conflict is present.

Returning to FIG. 6, the decision code (block 110) to determine if a bank conflict is present can be interspersed and/or overlapped with earlier instructions and, therefore, has a cost of 0 cycles. If no bank conflict exists (block 110), the processor 12 executes the load instructions (blocks 100 and 102) in cycle one and the use instructions (blocks 104 and 106) in the seventh cycle without delay as in the aggressive technique of FIG. 4. If, however, a bank conflict exists (block 110), the processor 12 executes the first load instruction in cycle 1 (block 100), and delays (block 108) the copy of the second load instruction (block 102') until the second cycle to avoid the six cycle penalty associated with the bank conflict. The copies of the first and second use instructions (blocks 104' and 106') then execute in the seventh and eighth cycles, respectively.

Making the same assumption as before, the cycle cost of the approach of FIG. 6 is:

4/5*7 cycles+1/5*8 cycles=7.2 cycles.

Thus, the cycle cost achieved by the apparatus of FIG. 3 is a 10% improvement relative to the defensive compiler in the example of FIG. 5, and a 12.1% improvement relative to the aggressive compiler of FIG. 4.

It will be appreciated by persons of ordinary skill in the art that the delay (block 108) of FIG. 6 could be achieved by inserting delays (which, on the Itanium® architecture, is done using stop bits) and/or by executing other useful instructions. Inserting other useful instructions that do not depend on the completion of either of the load instructions (block 100) is preferred because it increases the execution efficiency of the software by avoiding unused cycles. Similarly, other useful instructions (block 112) can be executed after blocks 104 and 106, if desired. As discussed in greater detail below, one particularly advantageous way to accomplish this selective execution of the use instructions in different cycles is to use predicates, as opposed to one or more branching statement(s). The use of predicates is advantageous vis-à-vis branching statement(s) because they have a lower execution time cost.

Figure 7:
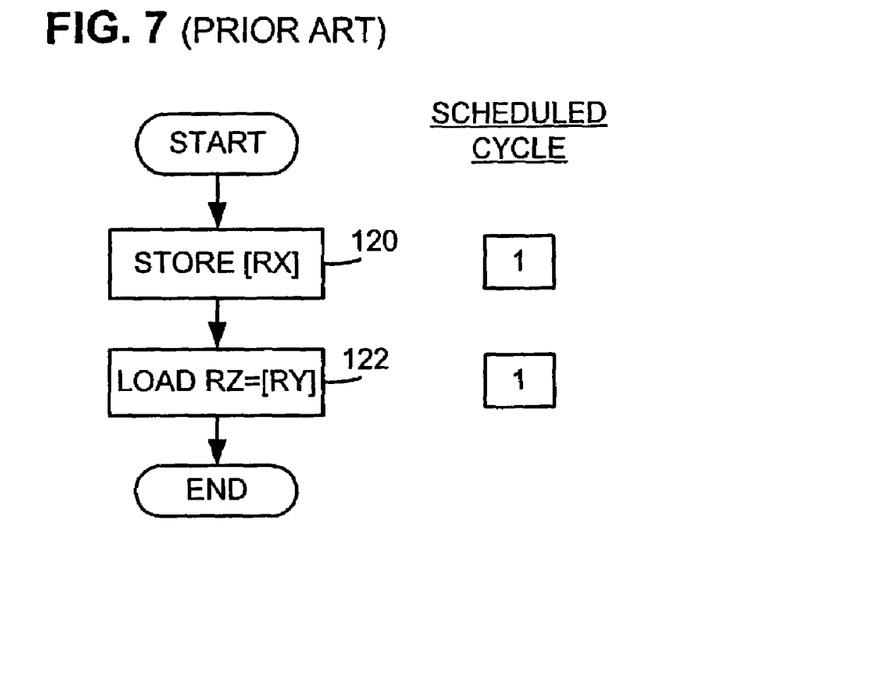
FIG. 7 illustrates a prior art approach to handling a potential conflict due to simultaneous accesses to the same cache line.
Figure 8:
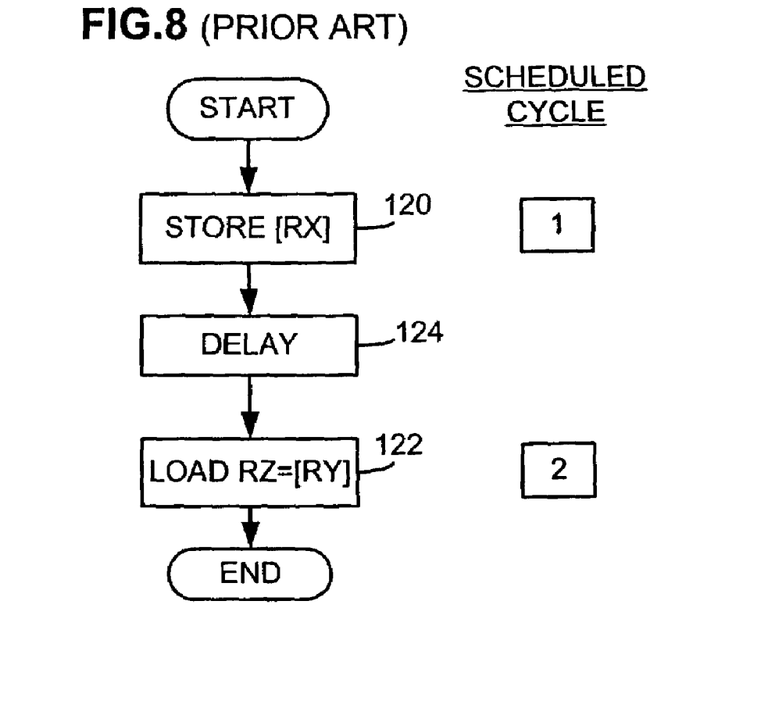
FIG. 8 illustrates another prior art approach to handling a potential conflict due to simultaneous accesses to the same cache line.
Figure 9:
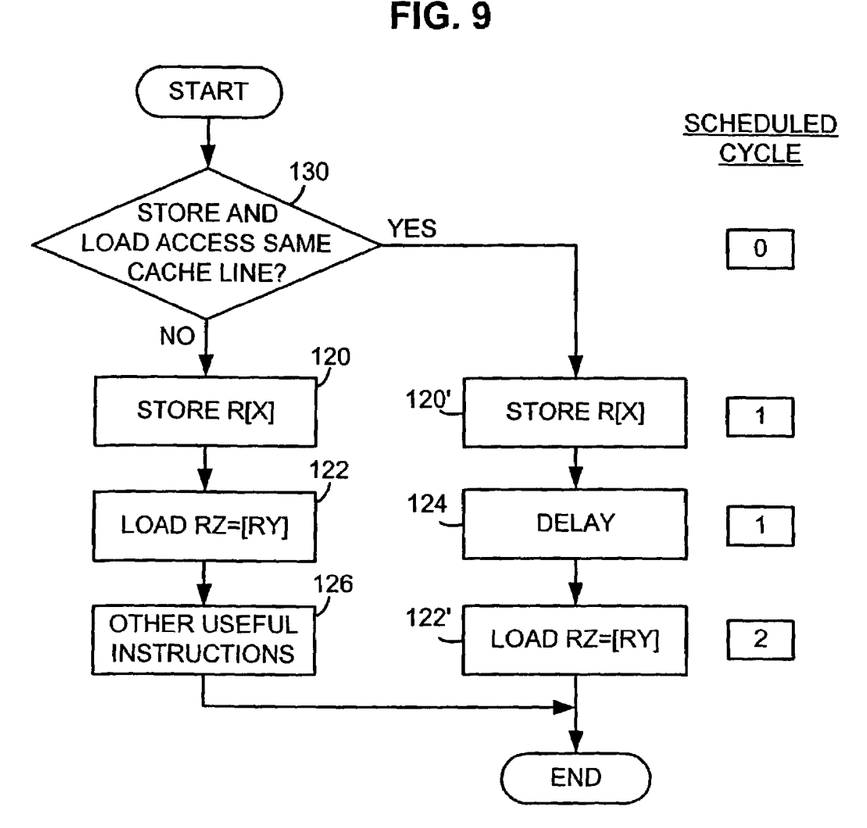
FIG. 9 illustrates an example way in which the apparatus of FIG. 2 handles the potential conflict due to simultaneous access to the same cache line.

Another example comparing an aggressive compiler, a defensive compiler and the apparatus of FIG. 3 is shown in FIGS. 7–9. Most memory hierarchies in modern processors have special cases causing run-time penalties. For example, Intel's Itanium2® processor inflicts a 17-cycle penalty to a load instruction issued after a store instruction in the same cycle when both instructions access the same cache line and either of these instructions misses the level one (L1) cache.

An example aggressive, prior art compiler's approach to this issue is shown in FIG. 7. In this example, the compiler simply schedules the store instruction (block 120) and the load instruction (block 122) in the same cycle; assuming that the frequency of both instructions accessing the same cache line and one instruction hitting and the other missing the L1 cache will be low. Assuming the instructions (blocks 120 and 122) address the same cache line with one of the instructions missing, one out of every 10 passes through the code, the average cycle cost of the aggressive technique is:

$$9/10*1 \text{ cycle} + 1/10*17 \text{ cycles} = 2.6 \text{ cycles}.$$

FIG. 8 illustrates an example approach to this same issue by a defensive, prior art compiler. In the example of FIG. 8, the compiler assumes the instructions (blocks 120, 122) will address the same cache line and have a miss of one of the store and load instructions (blocks 120, 122) at a relative high frequency. Thus, the compiler inserts a delay (block 124) between the store instruction (block 120) and the local instruction (block 122). Thus, the defensive approach shown in FIG. 8 improves on the 2.6 average cycle cost of the aggressive technique to an average cost of 2 cycles.

An example approach taken by the example apparatus of FIG. 3 to address the issue presented in FIGS. 7 and 8 is shown in FIG. 9. In this example, the apparatus inserts decision code (block 130) and copies of the store instruction (block 120') and the load instruction (block 122') into the code. As in the example of FIG. 6, the decision code (block 130) can be interspersed and/or overlapped with earlier instructions and, thus, has a cost of 0 cycles.

The decision code (block 130) can be implemented in many ways. For example, it can use the fact that a processor typically uses the lowest N bits of an address for cache indexing. Using the extr rb=ra, p, n instruction discussed above, the decision code can then extract and compare the lowest N bits of the address register for the store instruction (block 120) with the lowest N bits of the address register for the load instruction (block 122). If the comparison reveals a match, the store and load instructions (blocks 120, 122) access the same cache line. Otherwise, they do not access the same cache line.

Assuming for the moment that the same cache line is not accessed (block 130), the processor 12 executes the store instruction (block 120) and the load instruction (block 122) in the same cycle. Thus, for those instances where the same cache line is not accessed, the store and load operations (blocks 120, 122) are completed in one cycle.

If, on the other hand, the store and load instructions (blocks 120, 122) access the same cache line (block 130), the processor 12 executes a copy of the store instruction (block 120') in cycle 1. It then delays (block 124) until cycle 2, where it executes a copy of the load instruction (block 122'). Thus, when the store and load instructions (blocks 120, 122) access the same cache line (block 130), the store and load operations (blocks 120', 122') are completed in two cycles. Using the same assumption as in the prior art examples of FIGS. 7 and 8 (i.e., that the same cache line is addressed by the store and load instructions one out of ten times the code is executed), the average cycle cost is:

$$9/10*1+1/10*2=1.1 \text{ cycles};$$

which is about twice as fast as the prior art approaches described in connection with FIGS. 7 and 8.

Persons of ordinary skill in the art will appreciate that the delay (block 124) need not be dead time (i.e., stop bits), but instead can be used to execute other useful instructions. Similarly, in the instance where different cache lines are accessed by the store and load instructions (block 130), other useful instructions (block 126) can be completed in the second clock cycle as shown in FIG. 9.

Figure 10:
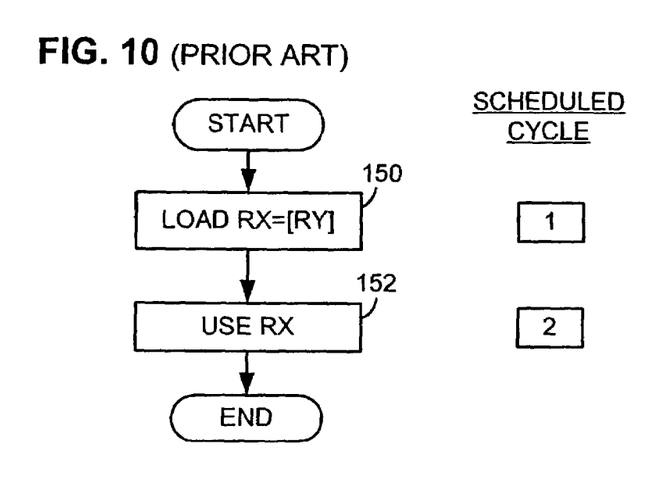
FIG. 10 illustrates a prior art approach to scheduling of a load instruction and a use instruction.
Figure 11:
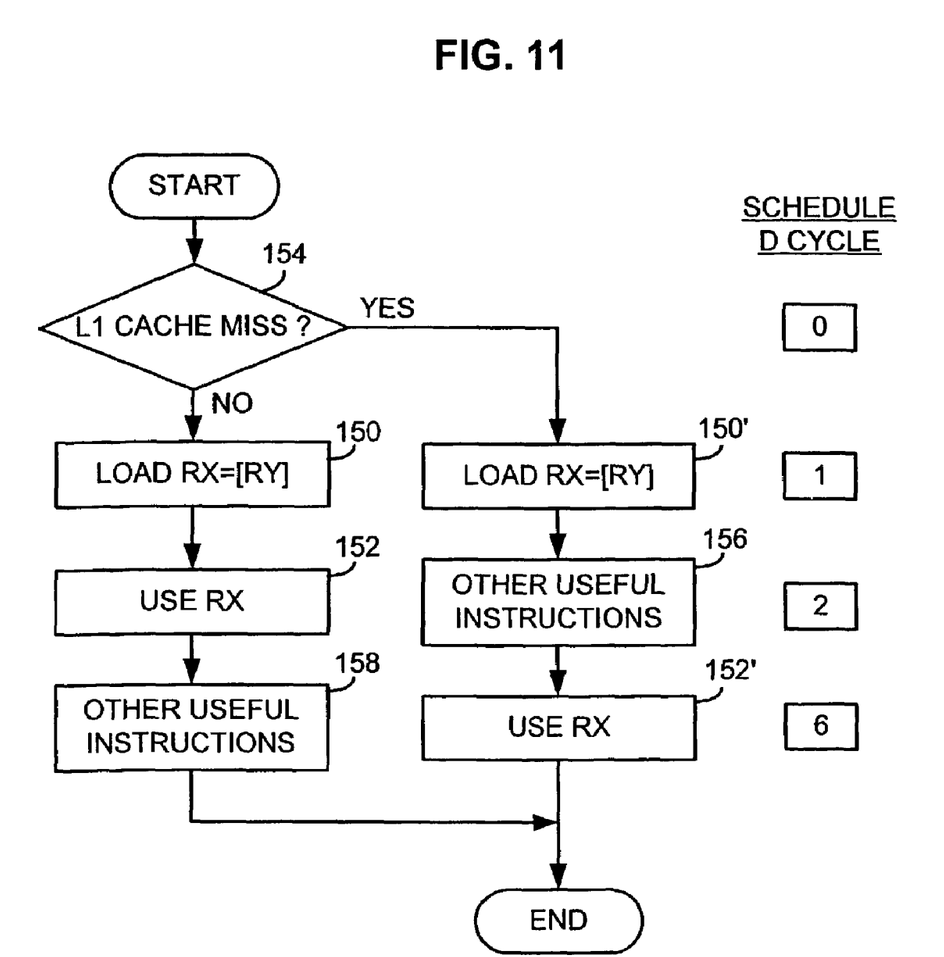
FIG. 11 illustrates an example manner in which the apparatus of FIG. 2 schedules the load and use instructions of FIG. 10 where a first level cache miss can be predicted.

Still another example comparing a prior art compiler to the apparatus of FIG. 3 is shown in FIGS. 10 and 11. The majority of prior art compilers schedule the use of a load in the first available cycle. For example, if L1 cache has a one cycle latency, prior art compilers will typically schedule a use instruction one cycle after the corresponding load instruction. This prior art approach for an L1 cache having a one-cycle latency is shown in FIG. 10. The load instruction (block 150) is scheduled in cycle 1. The use instruction (block 152) is scheduled in cycle 2.

In contrast, the apparatus of FIG. 3 and the instruction fission technique it employs leverage patterns where L1 cache misses can be predicted as a vehicle for scheduling alternate chains of duplicate instructions to optimize code execution speed, albeit at some cost in additional code. More specifically, if an L1 cache miss is not likely to occur (block 154), the use instruction (block 152) associated with a given load instruction (block 150) is scheduled to execute immediately after the load instruction by a time dictated by the latency of the L1 cache. Thus, in the example of FIG. 11 where L1 cache has a latency of one cycle, the load instruction (block 150) is scheduled to execute in cycle 1 and the associated use instruction (block 152) is scheduled to execute in cycle 2.

On the other hand, if an L1 cache miss is expected (block 154), a copy of the load instruction (block 150') is scheduled for cycle 1 and a copy of the use instruction (block 152') is scheduled for a cycle dictated by the latency of the L2 cache (e.g., cycle 6). As in prior examples, the time between the copy of the load instruction (block 150') and the copy of the use instruction (block 152') need not be wasted. Instead, other useful instructions (block 156) can optionally be scheduled to execute at that time. Similarly, other useful instructions (block 158) which may or may not be identical to the instructions scheduled at block 156 may be scheduled to execute after the use instruction (block 152).

Persons of ordinary skill in the art will appreciate that the disclosed instruction fission technique can be used to also schedule copies for additional levels of the memory hierarchy (e.g., where an L2 cache miss can be predicted). Persons of ordinary skill in the art will appreciate that each of the chains of instruction from which the decision code selects to execute should end at the same place in the code. This may be accomplished, for example, by inserting branch instructions at the end of each chain pointing to a branch marker (e.g., marker L discussed above).

Figure 12:
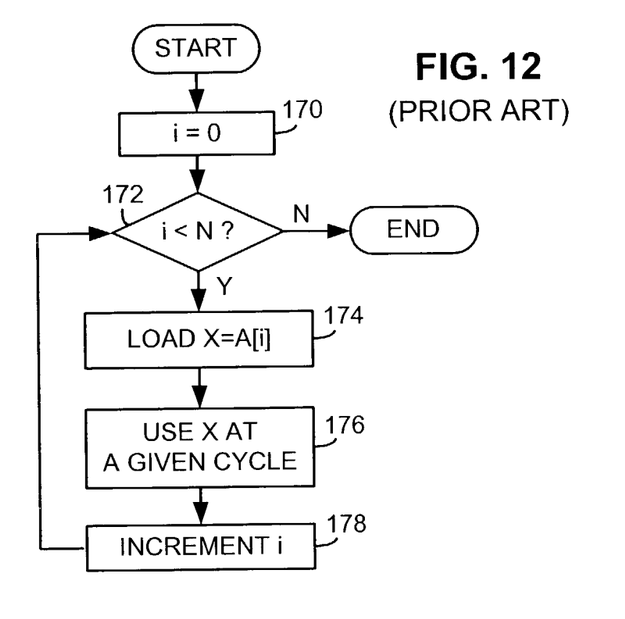
FIG. 12 illustrates a prior art routine where a loop accesses an array of elements.
Figure 13:
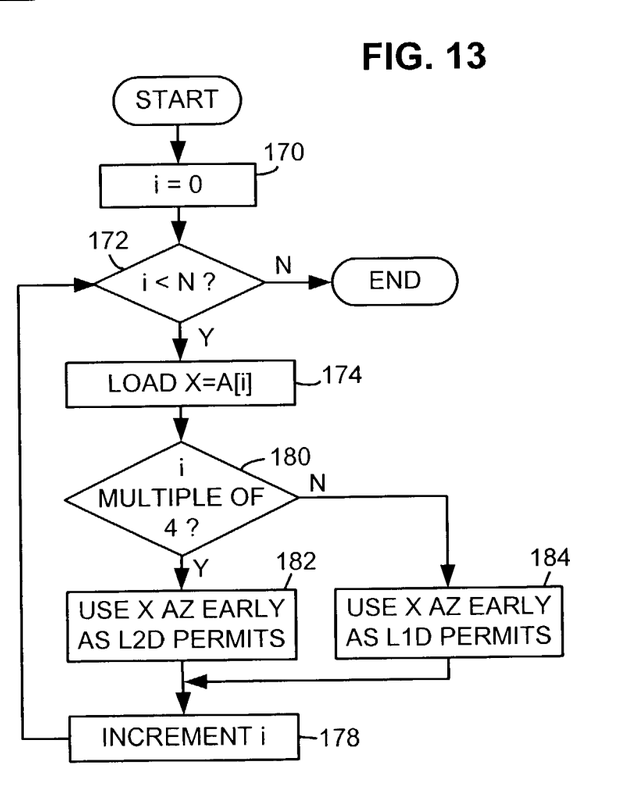
FIG. 13 illustrates an example manner in which the apparatus of FIG. 2 can modify the routine of FIG. 12 to avoid micro-architectural penalties.

Still another example comparing an example approach by a prior art compiler to load and use couples located in a loop to an example approach of the apparatus of FIG. 3 to that same circumstance is shown in FIG. 12–13. In the prior art example of FIG. 12, the processor first initiates a loop counter (i) to zero (block 170). Then, for as long as the loop counter (i) is less than a predetermined threshold (N) (block 172), the processor continues to loop through blocks 174–178. At block 174, the processor loads a retrieved value from a location A[i] defined in an array of addresses. The loaded value (X) is then used (block 176). The counter (i) is then incremented (block 178), and the loop (blocks 172–178) begins again if the counter (i) has not exceeded the threshold (N) (block 172).

In contrast, the fission technique employed in the example of FIG. 13 leverages the fact that, although the first element of the array (e.g., A[0]) read by the loop may not be in the first level of the cache, a set of elements following that first array element (A[0]) will be in the lowest level cache (e.g., L1 cache) once the first array element is read. In particular, due to cache spatial locality, several elements of the array are brought to the L1 cache in one cache line when the first element of the array is read. For instance, assuming a cache line stores the first four elements of the array A, a load of the first array element (A[0]) will actually bring the first four elements of the array (e.g., A[0], A[1], A[2] and A[3]) to the L1 cache. Therefore, although the initial read of the first element (A[0]) may involve the latency of the L2 cache, subsequent accesses to the second through fourth elements (e.g., A[1], A[2] and A[3]) will involve the shorter latency associated with the L1 cache since the read of the first array element A[0] necessarily brought the following three array elements to the L1 cache.

In this example, the fifth array element (A[4]) will not benefit from the spatial locality effect enjoyed by the second through fourth elements, because the fifth element is on a different cache line. Thus, an access to the fifth array element (A[4]) may involve an access to the L2 cache. In such a circumstance, the sixth through eighth array elements (A[5], A[6] and A[7]) would again enjoy the benefit of spatial locality. This example pattern, wherein every fourth element of the array requires an L2 cache access, and the three elements following each fourth element enjoy a spatial locality effect (e.g., they are pulled into L1 cache due to their proximity to their corresponding fourth element), can be leveraged by the instruction fission method. Indeed, any regular pattern of cache misses can be easily detected by a compiler and leveraged to avoid micro-architectural penalties.

Looking to the four array elements per cache line example wherein every fourth element requires an L2 cache access (i.e., a L1 cache miss), the processor 12 first sets the loop counter (i) to zero (block 170, FIG. 13). Then, for as long as the loop counter (i) is smaller than a predetermined threshold (N) (block 172), control will continue to loop through blocks 172–184.

In particular, at block 174 the element of the array A specified by the loop counter (i) is loaded to the variable X. Then, the processor 12 determines whether the loop counter (i) is a multiple of 4 (block 180). If it is a multiple of 4, then, in the current example, the load instruction (block 174) will miss the L1 cache. Accordingly, a copy of the use instruction (which may be the original instruction) operating on the data loaded into the variable X is executed as early as an access to L2 cache permits (block 182). On the other hand, if the loop counter (i) is not a multiple of 4 (block 180), then the load instruction (block 174) will hit in L1 cache due to the spatial locality effect. Accordingly, a copy of the use instruction (which may be the original instruction) operating on the data loaded into the variable X is executed as early as the L1 cache permits (block 184). In other words, the use instructions (blocks 182 and 184) are scheduled in different clock cycles, and which of the use instructions (blocks 182 and 184) executes is determined by the decision code (block 180) based on whether or not an L1 cache hit will occur. Regardless of which of the use instructions (blocks 182 and 184) executes, the loop counter (i) is incremented (block 178) and control returns to block 172. The loop defined by blocks 172–184 will continue to execute as explained above until the loop counter (i) is no longer less than the predetermined threshold (N) (block 172).

While the above example used the loop counter to predict an L1 cache miss, persons of ordinary skill in the art will readily appreciate that other tests could be employed. For example, the lowest bit(s) of a current pointer to the array could be tested instead of the loop counter.

From the foregoing, persons of ordinary skill in the art will appreciate that methods and apparatus have been disclosed for avoiding micro-architectural penalties in an in-order processor. The apparatus and methods insert decision code and one or more copies of one or more instructions into object code to enable the in-order processor to emulate an out-of-order processor. The in-order processor achieves this emulation by executing the decision code at run-time (as opposed to compile time) to decide which of an instruction or its cop(ies) will execute, wherein the instruction and its cop(ies) are scheduled for execution in different clock cycles of the processor. (In other words, execution of the instruction and/or its copy is predicated on a condition other than the control flow specified in the source code, and the decision code is not present in the source code.) The clock cycles are selected to match the possible dynamic effects that might be encountered due to the architecture or microarchitecture of the processor and/or the memory system associated with the processor. Thus, the cycles selected are application dependent, as are the decision code and the number of copies of the instruction(s) having the dynamic effect and any chain of instruction(s) dependent on the dynamic effect instruction(s).

Figure 14:
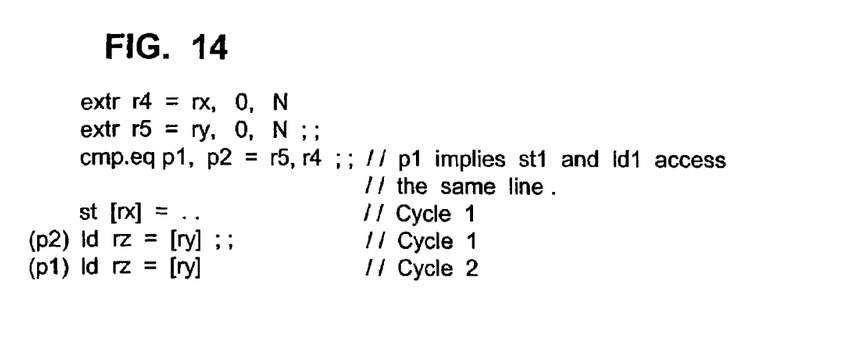
FIG. 14 is example pseudo-code corresponding to the example of FIG. 9.

Intel's Itanium® family of processors are particularly well suited to support the apparatus and methods described herein. This family of processors enables programmers to predicate which of a series of instructions will execute depending upon a condition, and supports the extract instruction discussed above. For example, pseudo-code supported by the Itanium2® processor and corresponding to the flowchart illustrated in FIG. 9 is shown in FIG. 14. In this pseudo-code, extr r4=rx, 0, N is the extraction instruction explained above. (cmp.eq p1, p2=r5, r4 sets the predicates p1 and p2 to "1" or "0" (e.g., true or false) based on a comparison of the values in registers R5 and R4, where if R5=R4, the p1 predicate is set to "1." Instructions predicated on P2 (i.e., instructions with the prefix "(P2)") execute only if P2=1, and instructions predicated by "(P1)," execute only if P1=1.

Figure 15:
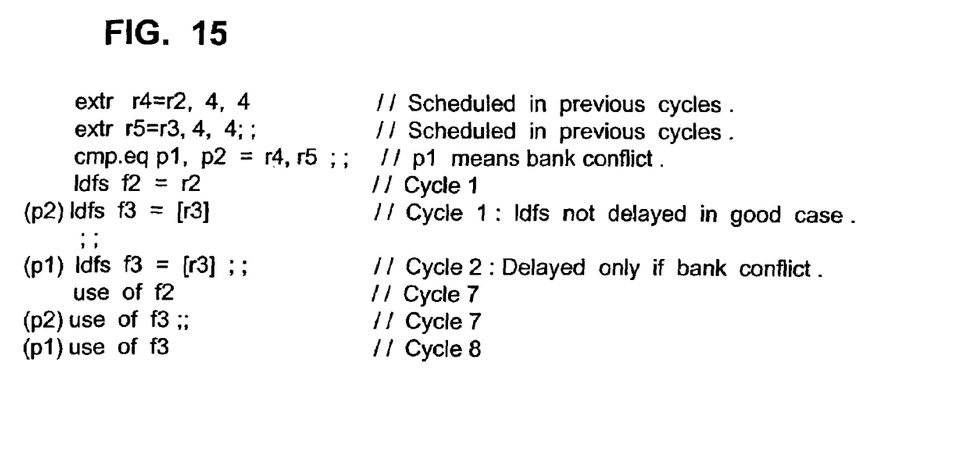
FIG. 15 is example pseudo-code corresponding to the example of FIG. 6.
Figure 16:
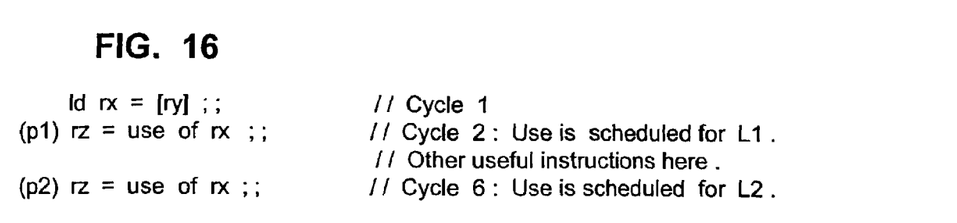
FIG. 16 is example pseudo-code corresponding to the example of FIG. 11.
Figure 17:
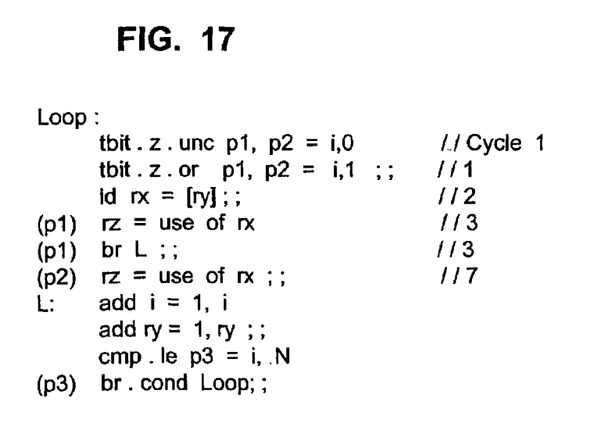
FIG. 17 is example pseudo-code corresponding to the example of FIG. 13.

By way of additional examples, pseudo-code supported by the Itanium2® processor and corresponding to the example of FIG. 6 is shown in FIG. 15, pseudo-code supported by the Itanium2® processor and corresponding to the example of FIG. 11 is shown in FIG. 16, and pseudo-code supported by the Itanium2® processor and corresponding to the example of FIG. 13 is shown in FIG. 17.

Figure 18:
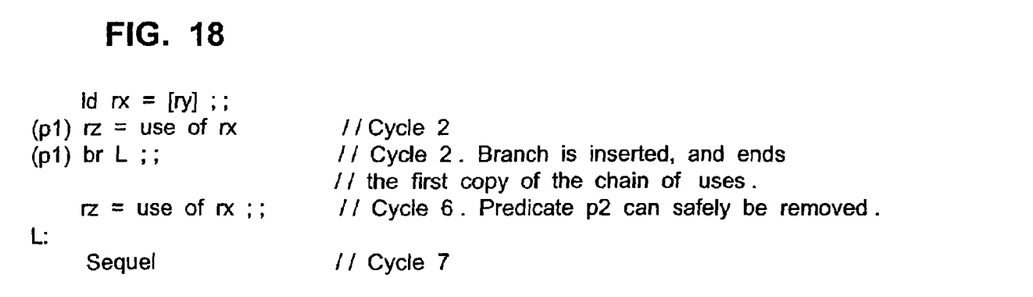
FIG. 18 is example pseudo-code illustrating an alternative approach to the example of FIG. 16.

When branching is used, it is sometimes possible to eliminate one or more predicates. For example, if in the example of FIG. 16, the original use statement is followed by a branch ("br L") statement, the predicate (P2) can optionally be removed from the second use statement as shown in the modified pseudo-code of FIG. 18. The branch instruction(s) (e.g., "br L") can be added to the code, or if the dynamic effect instruction was followed by a branch to an already existing branch label in the original source code, no additional branches need be added since all copies (except perhaps the latest scheduled copy) will automatically end in a branch to the branch label.

Although certain example methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use with an in-order processor, a method of compiling source code into object code comprising:
   identifying a first instruction for copying if the first instruction is involved in a dynamic effect, the dynamic effect comprising at least one of: (1) a bank conflict, (2) simultaneous access to a cache line, or (3) a spatial locality effect;
   copying the first instruction to create a second instruction identical to the first instruction;
   scheduling the first instruction to execute at a first time;
   scheduling the second instruction to execute at a second time; and
   predicating which of the first and second instructions executes on a value determined at run time.

2. A method as defined in claim 1 further comprising:
   duplicating a third instruction to create a fourth instruction; and
   predicating execution of the third and fourth instructions on the value determined at run time.

3. A method as defined in claim 2 wherein the third instruction is executed after the first instruction if the first instruction is executed, and the fourth instruction is executed after the second instruction if the second instruction is executed.

4. A method as defined in claim 1 wherein the first instruction is a first load instruction, and the value determined at run time indicates whether the first load instruction and a third load instruction address a same memory bank.

5. A method as defined in claim 4 wherein the value is determined by comparing a portion of a memory address associated with the first load instruction with a portion of a memory address associated with the third load instruction.

6. A method as defined in claim 1 wherein the first instruction is a first load instruction, and the value determined at run time indicates whether the first load instruction and a first store instruction occur in a same cycle and address a same cache line.

7. A method as defined in claim 6 wherein the value is determined by:
   comparing a cycle in which the first load instruction is scheduled with a cycle in which the first store instruction is scheduled; and
   comparing a portion of a memory address associated with the first load instruction with a portion of a memory address associated with the first store instruction.

8. A method as defined in claim 1 wherein the value determined at run time indicates whether the first instruction and a second instruction address a same cache line.

9. A method as defined in claim 1 wherein the first instruction is a first load instruction which occurs during a loop, and wherein the value determined at run time indicates whether the loop has been executed a multiple of a number of times.

10. For use with an in-order processor, a method of compiling source code into object code comprising:
    identifying a first instruction for copying if the first instruction is involved in a dynamic effect, the dynamic effect comprising at least one of: (1) a bank conflict, (2) simultaneous access to a cache line, or (3) a spatial locality effect;
    copying the first instruction to create a second instruction identical to the first instruction;
    predicating execution of the first instruction on a value determined at run time; and
    branching past the second instruction if the first instruction executes.

11. A method as defined in claim 10 further comprising:
    duplicating a third instruction to create a fourth instruction; and
    predicating execution of the third instruction on the value determined at run time.

12. A method as defined in claim 11 wherein the third instruction is executed after the first instruction if the first instruction is executed, and the fourth instruction is executed after the second instruction if the second instruction is executed.

13. A method as defined in claim 10 wherein branching past the second instruction if the first instruction is executed further comprises branching past the second and fourth instructions after the first instruction and the third instruction execute.

14. For use with an in-order processor, a method of compiling source code into object code comprising:
    identifying a first instruction for copying if the first instruction is involved in a dynamic effect, the dynamic effect comprising at least one of: (1) a bank conflict, (2) simultaneous access to a cache line, or (3) a spatial locality effect;
    copying the first instruction to create a second instruction identical to the first instruction;
    adding the second instruction to the object code; and
    inserting decision code into the object code to decide at run time of the object code which of the first and second identical instructions executes based on a condition other than control flow specified in the source code.

15. A method as defined in claim 14 further comprising:
    duplicating a third instruction to create a fourth instruction; and
    adding the fourth instruction to the object code.

16. A method as defined in claim 15 wherein the third instruction is executed after the first instruction if the first instruction is executed, and the fourth instruction is executed after the second instruction if the second instruction is executed.

17. A method as defined in claim 14 further comprising branching past the second instruction if the first instruction executes.

18. For use with an in-order processor, a computing apparatus to produce object code from source code comprising:
    a dynamic effect identifier to identify an instruction which has a dynamic effect, the dynamic effect comprising at least one of: (1) a bank conflict, (2) simultaneous access to a cache line, or (3) a spatial locality effect;
a code duplicator to create an identical copy of the instruction; and
a decision code generator to generate decision code for inclusion in the object code, the decision code executing at run time of the object code to determine which of the instruction and the copy of the instruction is executed.

19. An apparatus as defined in claim 18 further comprising a scheduler to schedule an order of execution of the object code.

20. For use with an in-order processor, a tangible medium storing computer readable instructions comprising:
first software to identify an instruction which has a dynamic effect, the dynamic effect comprising at least one of: (1) a bank conflict, (2) simultaneous access to a cache line, or (3) a spatial locality effect;
second software to create an identical copy of the instruction; and
third software to generate decision code for inclusion in the object code, the decision code executing at run time of the object code to determine which of the instruction and the copy of the instruction is executed.

21. A tangible medium as defined in claim 20 further comprising fourth software to schedule an order of execution of the object code.

22. A computer comprising:
a memory to store source code and a compiler;
an in-order processor to execute the compiler to compile the source code into object code, wherein the compiler causes the processor to identify an instruction which has a dynamic effect, to create an identical copy of the instruction, and to generate decision code for inclusion in the object code, the decision code executing at run time of the object code to determine which of the instruction and the copy of the instruction is executed, the dynamic effect comprising at least one of: (1) a bank conflict, (2) simultaneous access to a cache line, or (3) a spatial locality effect.

23. A computer as defined in claim 22 wherein the compiler causes the processor to schedule an order of execution of the object code.

24. For use with an in-order processor, a method of compiling source code into object code comprising:
copying a first load instruction to create a second load instruction identical to the first load instruction;
scheduling the first load instruction to execute at a first time;
scheduling the second load instruction to execute at a second time; and
predicating which of the first and second load instructions executes on a value determined at run time, the value indicating whether the first load instruction and a third load instruction address a same memory bank.

25. A method as defined in claim 24 wherein the value is determined by comparing a portion of a memory address associated with the first load instruction with a portion of a memory address associated with the third load instruction.

26. For use with an in-order processor, a method of compiling source code into object code comprising:
copying a first load instruction to create a second load instruction identical to the first load instruction;
scheduling the first load instruction to execute at a first time;
scheduling the second load instruction to execute at a second time; and
predicating which of the first and second load instructions executes on a value determined at run time, the value indicating whether the first load instruction and a first store instruction occur in a same cycle and address a same cache line.

27. A method as defined in claim 26 wherein the value is determined by:
comparing a cycle in which the first load instruction is scheduled with a cycle in which the first store instruction is scheduled; and
comparing a portion of a memory address associated with the first load instruction with a portion of a memory address associated with the first store instruction.

28. For use with an in-order processor, a method of compiling source code into object code comprising:
copying a first load instruction which occurs during a loop to create a second load instruction identical to the first load instruction;
scheduling the first load instruction to execute at a first time;
scheduling the second load instruction to execute at a second time; and
predicating which of the first and second load instructions executes on a value determined at run time, the value indicating whether the loop has been executed an integer multiple of a number of times.

29. A method as defined in claim 28 wherein the number is equal to a number of elements of an array stored in a single cache line.

* * * * *